W. E. SULLIVAN.
PORTABLE LIGHTING PLANT.
APPLICATION FILED AUG. 2, 1918.
1,380,123.
Patented May 31, 1921.
2 SHEETS—SHEET 1.
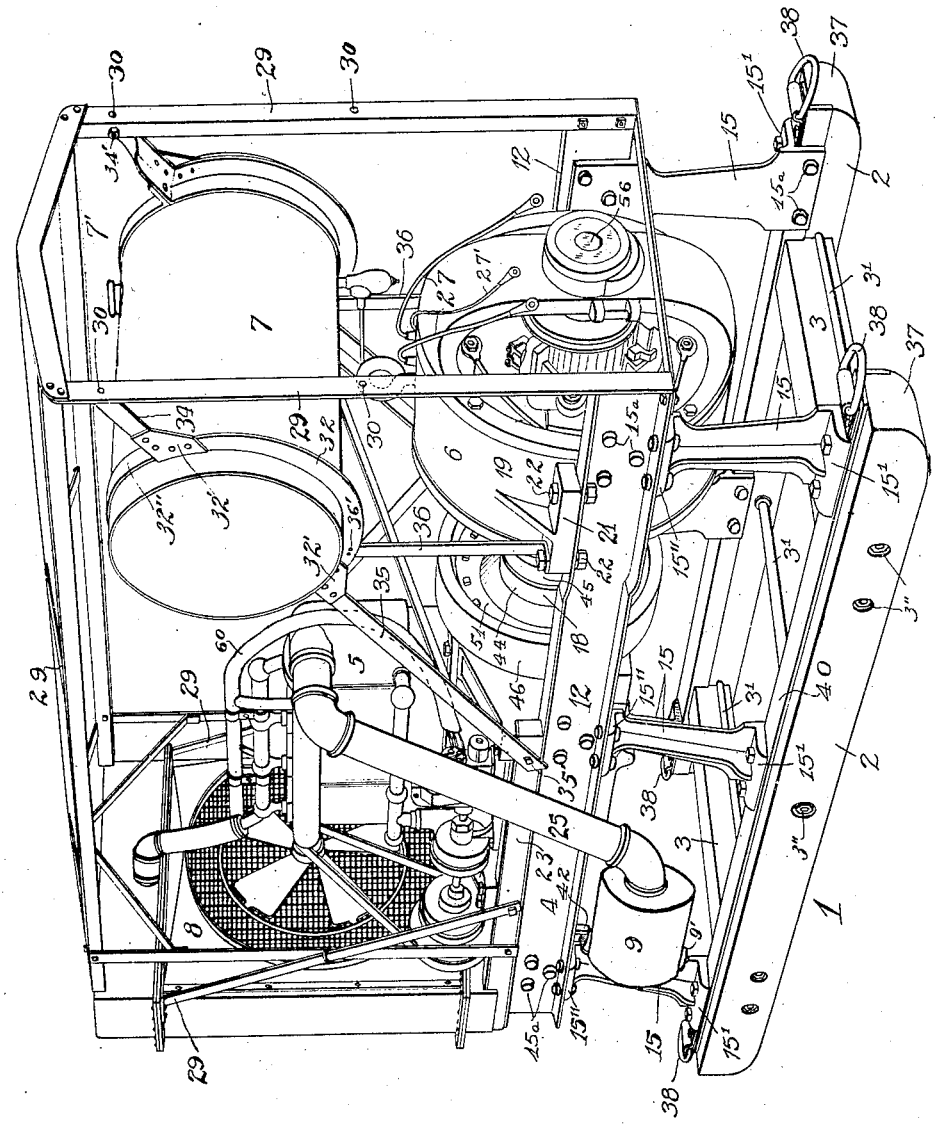
WITNESSES:
Martin H. Olsen
Fred M. Davis
INVENTOR.
William E. Sullivan.
BY Rummler & Rummler
ATTORNEYS.

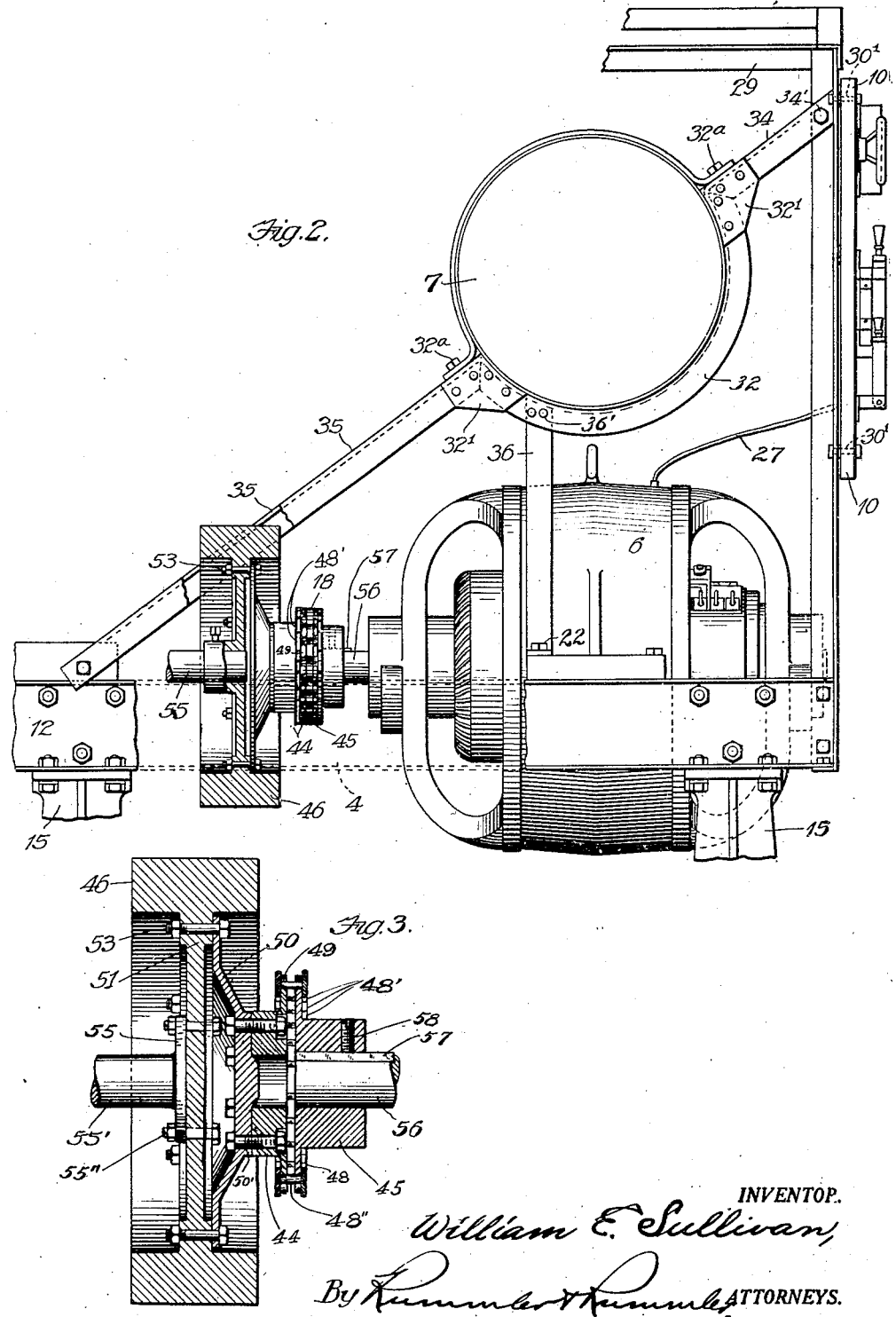

UNITED STATES PATENT OFFICE.

WILLIAM E. SULLIVAN, OF ROODHOUSE, ILLINOIS.

PORTABLE LIGHTING-PLANT.

1,380,123. Specification of Letters Patent. Patented May 31, 1921.

Application filed August 2, 1918. Serial No. 248,024.

*To all whom it may concern:*

Be it known that I, WILLIAM E. SULLIVAN, a citizen of the United States of America, and a resident of Roodhouse, county of Greene, and State of Illinois, have invented certain new and useful Improvements in Portable Lighting-Plants, of which the following is a specification.

This invention relates to portable power apparatus, and more particularly to light weight portable means such as required by circuses and the like for generating electric light by direct driven dynamo-electric machinery.

The main objects of the invention are to provide such a plant of improved form and construction adapted to withstand the roughest usage and unskilled handling, such as are required of circus outfits and such also as are necessary for field service in war operations; to provide a portable lighting unit complete, adapted for ready transportation and handling under all conditions of weather, roads and motive power; to provide an improved mechanical arrangement of the switchboard, generator, engine, fuel-tank and muffler; to provide an improved form of direct coupling for the engine and generator; to provide an improved form of support and mounting for the fuel-tank; to provide a supporting frame of improved form adapted for carrying the apparatus low, especially in military service and trench use, and adapted for skidding about without wheels; and to provide an improved form of skids and means for securing same in place as a part of said frame.

While it is always important that such a plant should rest firmly on the ground when in use, it is equally important that it should be low and easily movable for short distances as by skidding on the ground by hand or otherwise, particularly in military service. It is also imperative in such service that the device as a whole be absolutely complete and unitary, and as compact as possible. In connection with circuses also this type of apparatus fills a very important need, where the essentials are compactness, ready mobility and adaptability for quick loading and unloading from trains. The plant as a whole must be both simple and "fool-proof."

Military operations under present day conditions require great speed in moving and handling all apparatus, and the increased extent of night activity greatly augments the importance of dependable lighting plants of the character stated.

An illustrative embodiment of this invention is shown in the accompanying drawings, in which—

Figure 1 is a perspective view of a portable lighting plant complete.

Fig. 2 is an enlarged fragmentary detail showing the generator and the shaft connection therefor, the fuel tank and one end of the switchboard.

Fig. 3 is a more greatly enlarged detail showing the shaft connection for the engine and generator.

In the embodiment shown in the drawings, a drag frame 1 is provided comprising a pair of ground skids 2, the upper parts of which are connected by a plurality of cross bars 3, and 3' having sufficient elevation to clear the ground, the load being carried entirely by said skids. Upon said frame there is built a super-structural framework 4, whereon the various parts of the apparatus are mounted, as for instance the engine 5, the generator 6, the fuel-tank 7, the radiator 8, the exhaust muffler 9 and the switchboard 10 for controlling the generator and lighting circuit.

The frame superstructure 4 comprises mainly a pair of side rails or bars 12 disposed at the same level in parallel relation to each other as well as to the skids 2 upon which they are mounted being supported thereon in spaced relation by a plurality of uprights 15, the ends of which are secured to said skids and the corresponding side bars as at 15' and 15" respectively.

The engine and generator are mounted on opposite ends of said frame 4 and their shafts being disposed in alinement are connected directly by a flexible coupling 18 adapted to drive the generator at the same speed as the engine but providing for a limited degree of shaft buckling and vibration of such character as would tend to weaken or break same if a rigid connection were used.

The generator is provided with a cylindrical yoke ring 19, said ring having a pair of outwardly projecting downwardly facing lugs or supports 21 formed and arranged to rest on the upper face of the side rails 12, to which they are rigidly secured by bolts 22.

The engine shown is of the internal combustion type and is secured to a short base frame 23 together with the radiator 8. Said frame 23 rests upon and is bolted to the opposite ends of the side rails 12 from the generator 6.

The exhaust muffler 9, having an outlet at 9', is positioned on one side of the frame below the side rails 12 adjacent to the radiator and is connected with the exhaust port of the engine by means of a tubular connection 25 disposed diagonally as shown in Fig. 1.

The radiator 8 for the engine is mounted on said frame 23, and is positioned at the extreme end of the frame 4 opposite from the generator. The switchboard panel 10 is mounted on the extreme end of said frame 4 opposite from the engine and is connected to the nearby generator by means of a pair of main power leads or cables 27, and a third conductor 27' the loose ends of which are shown in Fig. 1 where the switchboard panel is removed, in order to show more fully the frame structure and the mounting of the generator and the fuel tank.

A light framework 29 is provided above the frame 4 to support the switchboard 10, and if desired a covering (not shown). Said framework 29 is provided with bolt holes 30 for securing the panel 10.

The fuel tank is of cylindrical shape and is mounted horizontally over the generator with its main axis disposed transversely of the frame 4 and generator axis and with its filler opening 7' near one end where easily accessible. Said tank is carried on the framework 29 which includes a pair of inclined supports, one over each sill 12, said supports having ring-like medial parts 32, disposed adjacent to each end of the tank which is secured rigidly thereto. Each of said supports is mainly of angle iron construction and includes a pair of arms 34 and 35 disposed in alinement, one of which extends upward from the ring part 32 and is secured by bolt 34' to the switchboard end of frame 29 and the other of which extends downward and is secured substantially to the middle part of the corresponding channel 12 of the main frame, though actually bolted at 35' to the base member 23. Uprights 36 secured at 36' to the downward flange of the ring part 32 also assist in supporting tank 7.

The lower half or saddle of the ring member 32 is preferably integral with the arms 34 and 35. The vertical flange of each bar is notched to facilitate bending and the bends are reinforced by means of gusset plates 32'. The upper half of the ring member is in the form of a semi-circular strap of metal 32" detachably connected by screws 32ª to the arms 34 and 35, whereby the tank is held demountably.

Supplementary frame members are provided connecting with switchboard end of the frame and the radiator and sufficient to support whatever protective covering may be desired. Such covering may be made of canvas or the like which may be used in wet weather and it may be applied to the device when in transit to protect it from the elements and also prevent tampering.

The skid sills proper are formed with rounded upturned bearing faces 37 at both ends in order to facilitate sliding over the ground or over the snow depending on the season of the year. In order to prevent separation of the skids the spacing blocks 3 are supplemented by the iron tension rods 3' secured tightly by nuts 3". Each skid is provided on each end with a ring or loop 38 adapted to facilitate attaching a cable or chain whereby the plant may be drawn from place to place. The rings 38 are preferably attached to the ends of angle bars 40 secured to the upper sides of the sills 2. The legs 15 are secured at each end by rivets 15ª.

The starting crank 42 is at the end of frame 4 just beneath the radiator.

The shaft connection comprises a pair of complementary members 44 and 45 secured one to the fly wheel 46 of the engine and the other to the generator shaft and a member 48 connecting same together somewhat loosely. Said members 44 and 45 are in the form of hubs with plate-like flanges having sprocket teeth 49, and the yielding member 48 is in the form of a loose fitting sprocket chain, which is adapted to take up vibrations and absorb shocks, and includes links 48' and cross bars 48". The adjacent toothed flanges connected by the sprocket chain are normally spaced apart somewhat and the chain 48 fits somewhat loosely, so that the shafts are connected flexibly enough to avoid trouble, both as to bending and as to end thrusts.

The member 44 is provided with an outwardly extending flange 50 fastened thereto by bolts 50' which flange is disposed against the radial web 51 of the fly wheel to which it is detachably secured by bolts 53, said fly wheel being fixed on the end flange 55 of the engine shaft 55' by bolts 55".

The member 45 is fixed on the end of the generator shaft 56 by means of the key 57 and set screw 58 as understood in the art. The fly wheel is attached to the shaft flange 55 by bolts.

A tube 60 preferably of fiber, extends from the top of the engine to the spark generator and carries the ignition wiring as will be understood.

The radiator 8 is provided with a large fan 8' which is run at a high speed and makes a strong blast of air, which is not only drawn through the radiator and cools the water but is driven back over the top of and about the power plant and helps cool the engine, especially the exhaust pipe 25. Furthermore this blast of air rushes on under and past the fuel tank 7 whereby any leakage of gasolene is immediately evaporated and carried away and so prevented from falling on the generator or other part of the equipment where it might become ignited or cause other harm. Owing to this feature it is permissible to mount the fuel tank compactly in the frame 29 at the point most available and convenient; namely, back of the engine and directly over the generator at a much lower level than if it were mounted over the engine, frame 4 being too low to permit mounting the tank beneath the power apparatus. There is no possibility of igniting leakage from the tank by brush sparking, for the reason that the fan begins to turn initially and creates a strong draft before sufficient voltage is generated to create sparking and before the generator circuit is closed. Before any sparking can occur, a sufficient draft is produced to effectively drive away all fuel vapor that may leak from the tank or fuel connections.

My improved portable lighting plant is used as follows: Chains or cables are attached to the rings 38 at one or both ends of the skids 2. Then by pulling on said chains the plant as a whole may be drawn about, forward or backward, both for loading and unloading from freight cars, and for moving about on the ground or in trenches or wherever the use of such a plant may be desirable. Moreover it can be moved about while running and furnishing power for lights, provided suitable flexible line cables are used for the distribution mains leading out from the switchboard 10.

Although but one specific embodiment of this invention has been herein shown and described, it will be understood that numerous details of the construction shown may be altered or omitted without departing from the spirit of this invention as defined by the following claims.

I claim:

1. A portable lighting plant comprising a rectangular frame including a pair of bars spaced apart, in combination with an upright internal combustion engine and a dynamo-electric machine of less height than said engine and direct connected in axial alinement between said bars and supported thereon, a fuel tank mounted in front of said engine above said generator and supported on said frame, and an electric control panel disposed in upright position across the generator end of said frame, in front of said tank.

2. A portable lighting plant including a skid frame member and a machine mounting frame member rigid therewith, said members being disposed in parallel relation, the latter over the former, and held rigidly in spaced relation by a plurality of uprights, and power generating means mounted on the upper frame member.

3. A non-tipping portable lighting plant comprising a pair of skids with a low set mounting frame thereon adapted for ready mobility and current generating apparatus mounted thereon, said frame including a pair of side rails spaced to receive said apparatus set low between them, and said apparatus having lateral downwardly facing supporting shoulders resting on said rails.

4. A portable lighting plant comprising a frame of oblong shape adapted for endwise movement, an internal combustion engine, and an electric generator mounted on opposite ends thereof, the former standing considerably higher than the latter, said frame having tank supports secured thereto, a fuel tank mounted on said supports in the space above the generator and draft producing means adapted to be driven by the engine whereby a strong current of air may be maintained between the generator and tank sufficient to remove all fuel which may leak from said tank and prevent deposit thereof on or near the generator.

Signed at Chicago this 23rd day of July, 1918.

WILLIAM E. SULLIVAN.